July 11, 1961

J. M. ANDREWS 2,992,304

ELECTROMAGNETIC THRUST MOTOR

Filed Jan. 6, 1958

2 Sheets-Sheet 1

INVENTOR.
John M. Andrews
BY
Ooms, McDougall, Williams & Hersh
Attorneys

July 11, 1961

J. M. ANDREWS 2,992,304

ELECTROMAGNETIC THRUST MOTOR

Filed Jan. 6, 1958

2 Sheets-Sheet 2

INVENTOR.
John M. Andrews
BY
Ooms, McDougall, Williams & Hersh
Attorneys

United States Patent Office 2,992,304
Patented July 11, 1961

2,992,304
ELECTROMAGNETIC THRUST MOTOR
John M. Andrews, Evanston, Ill., assignor to Cook Electric Company, Chicago, Ill., a corporation of Delaware
Filed Jan. 6, 1958, Ser. No. 707,152
10 Claims. (Cl. 200—87)

This invention relates to electromagnetic thrust motors of the sort generally used for operation of electric relays, fluid valves, and the like. The embodiments of my invention herein described are particularly adapted for applications in which small physical size and electric-power consumption must be combined with relatively large thrust.

The present specification is a continuation-in-part of my copending application Serial No. 688,032, entitled, "Electromagnetic Relay," filed October 3, 1957, now abandoned.

My invention has particularly important applications in apparatus designed to be airborne by aircraft or guided missiles, since it can be made in very small size and weight, will operate with a minimum of electric power, and will yield much more thrust for a given size, weight, and power consumption than can be had from prior-art relays. Moreover, my invention is characterized by rugged mechanical structure which can withstand heavy shock and vibration without damage.

It is accordingly a major object of my invention to provide a miniature electromagnetic thrust motor, suitable for use in relays and the like, which is characterized by mechanical ruggedness, small size, and light weight.

It is a further object of my invention to provide a miniature electromagnetic thrust motor which will deliver substantially greater thrust for a given power input than miniature motors of the sort heretofore available.

It is a further object of my invention to provide a miniature thrust motor whose inherent design renders it shock-proof and vibration-proof to an extraordinary degree.

A further object of my invention consists in providing an electric relay, electromagnetically operated, wherein the armature is mechanically isolated from the electrical contacts or other actuated parts, so that the relatively massive armature assembly is free to move responsively to shock or vibration without producing "contact chatter" or other malfunction of the actuated parts.

Other objects and advantages of the invention will appear from the following detailed description of certain typical embodiments.

Figure 1:
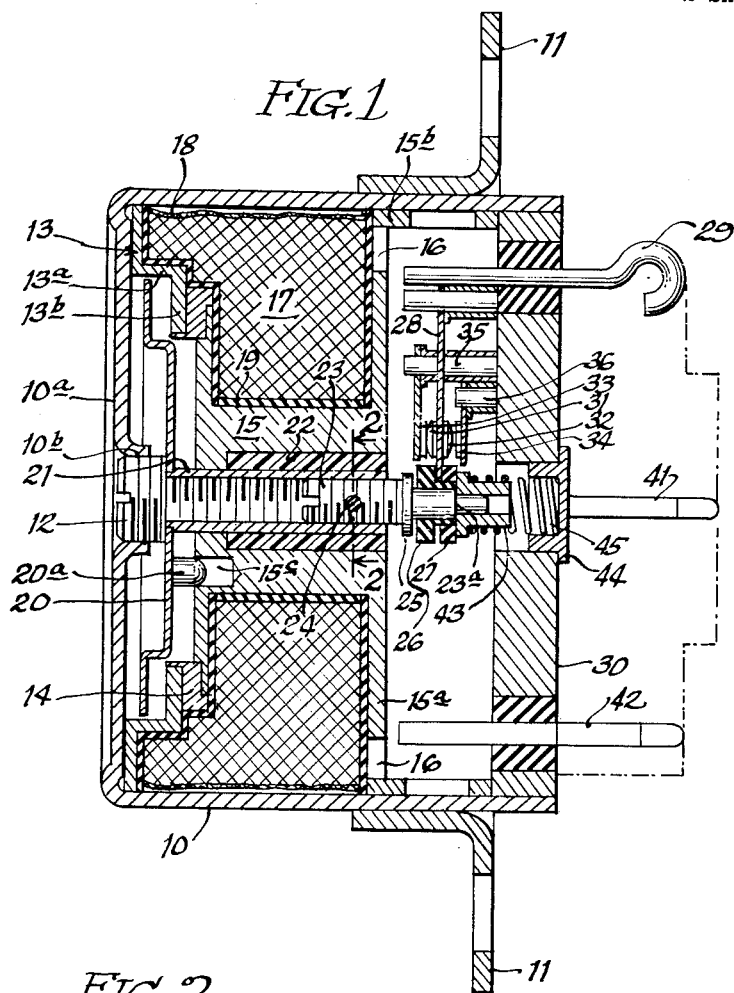
Figure 2:
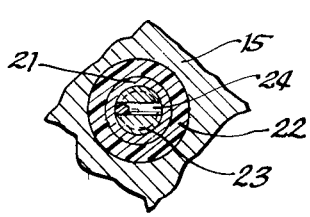
Figure 3:
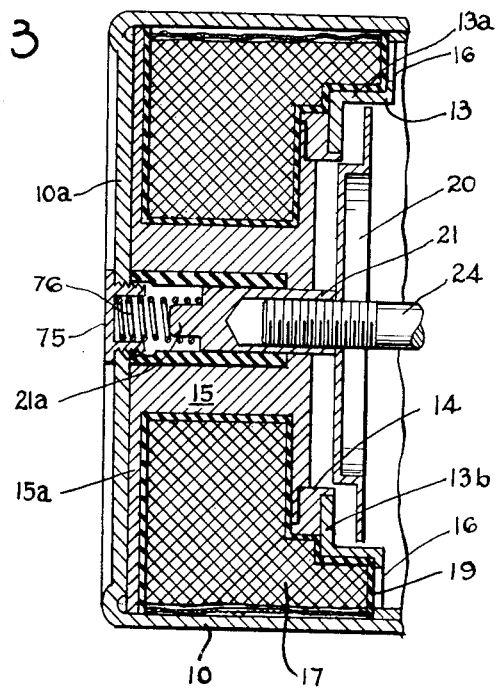
Figure 4:
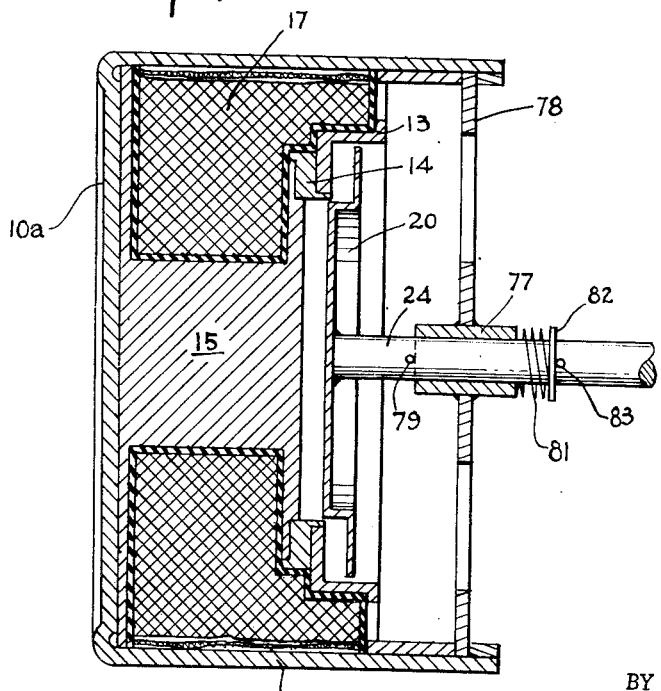

In the appended drawing, FIGURE 1 is a sectional view of a typical embodiment of my invention, wherein my thrust motor is employed as the actuating means in an electric relay. The section in FIG. 1 is taken generally through the axis of the instrument. FIG. 2 is a fragmentary sectional view taken along the line 2—2 of FIG. 1, to bring out one of the structural details of the FIG. 1 instrument. FIG. 3 is a sectional view of a modified form of my thrust motor which is the subject of the present invention. FIG. 4 is a sectional view similar to FIG. 3 but showing still another modification or alternative embodiment of the invention.

The relay shown in FIG. 1 is intended to be assembled as a hermetically sealed unit, a type of construction which is essential in applications wherein the instrument is to be subjected to wide variations in temperature, pressure, and humidity. As a result, abutting parts, even though screwed together or press-fitted, will normally be factory-sealed by soldering, brazing, or other suitable means.

The instrument is mounted within a cup-shaped housing or enclosure 10 made of high-quality magnetic iron. If desired, two or more mounting lugs 11 may be secured at appropriate positions to the outer surface of the housing 10.

At one end the housing 10 has an integrally formed top plate 10a which is unrelieved save for a threaded central aperture 10b into which is fitted an adjustment screw 12 of non-magnetic material, having a slotted head. Adjustment screw 12, as will hereafter be explained, functions as a means of adjusting armature travel. In the manufacture of a relay in accordance with FIG. 1, the adjustment screw 12 will normally be set to the proper position at the factory and will then be sealed permanently as heretofore mentioned.

Fitted within the housing 10 and bearing against the inner surface of top plate 10a is a secondary core piece 13, made of high-grade magnetic iron. Core piece 13 is generally annular in shape, consisting of a base portion dimensioned to fit snugly within the housing 10, a body portion 13a of cylindrical conformation extending away from the base portion at right angles, and an inner annular flange 13b extending inboard of the body portion 13a in a plane parallel to the plane of the base portion heretofore referred to.

Resting on and partially nested within the flange 13b of secondary core piece 13 is an isolator ring 14, made of brass or other non-magnetic material, annular in shape and having a narrow lip portion which extends through the central aperture in core piece 13, terminating flush with the upper surface of the flange 13b. Ring 14 also has a shallow annular recess on its rear face, into which is nested the upper surface of primary core piece 15.

Primary core piece 15 has an annular head flange dimensioned for a snug fit with ring 14. The main body portion of primary core piece 15 extends away at right angles from the head flange, the body portion having a cylindrical conformation and being provided at its base with a wide annular flange 15a which extends all the way out to the inner surface of housing 10. At its outer perimeter, the base flange 15a has a rim 15b engaging the inner surface of housing 10 and press-fitted or otherwise rigidly secured thereto. The flange 15a contains a pair of apertures 16, diametrically disposed, which serve as passages through which connecting wires (not shown) may extend from the coil presently to be described.

Wound over the primary core piece 15, on a suitable insulated form 19, is a magnet coil 17, consisting of a large number of turns of fine copper wire. The exact size of wire is of course a matter of design; in most applications, a wire should be selected of a gauge between No. 36 and No. 40. The winding 17 will normally be covered by one or more layers of insulating cloth 18, and the coil should preferably be treated with a suitable moisture-resistant varnish or other coating compound.

As may be clearly seen in FIG. 1, the coil 17 not only occupies all the space between the flanges of the primary core piece 15 but also extends therebeyond, in two steps, so as to overlie the body portion of the secondary core piece 13, the upper edge of the coil form 19, in the axial direction, bearing against the under surface of the base portion of core piece 13. This axial extension of the coil 17 plays an important part in the superior results achieved with my invention and constitutes an important part of the invention.

Armature 20 is made of high-grade magnetic iron and is formed in the shape of a shallow cup having an outwardly extending annular flange or lip on its upper rim. The flange portion of the armature 20 is proportioned to overlie the inwardly extending flange 13b of the secondary core piece, while the cup-shaped body portion of the armature 20 is dimensioned to slip within the annular space defined by the lip of ring 14. A guide pin 20a of non-magnetic material such as stainless steel may be provided on the under side of the armature to prevent its rotation relative to the core-piece assembly, pin 20a being received within a shallow aperture 15c in the upper face of the primary core piece 15.

The depth of the cup-shaped portion of the armature 20 is approximately equal to the axial distance separating the upper surface of primary core piece 15 and the upper surface of flange 13b of the secondary core piece.

Rigidly secured to the center of armature 20 and extending perpendicularly backward therefrom is a hollow pusher rod 21, made of a suitable non-magnetic material such as stainless steel. The primary core piece 15 is provided with a central aperture to receive the pusher rod 21, and a bushing 22 of Teflon or other suitable plastic is fitted within the central aperture, being cemented or otherwise secured in place.

The pusher rod 21 is hollow and is threaded to receive an adjustable extension screw 23, also made of non-magnetic material such as stainless steel. The upper end of extension screw 23 is slotted to permit adjustment, and it is made self-locking by means of a locking pin 24 set therein at right angles to its direction of travel. (See FIG. 2.)

As FIG. 1 shows, extension screw 23 protrudes outwardly below the under side of primary core piece 15 for a considerable distance, and it has near its lower end an annular shoulder or land 25. Below the land 25, screw 23 is not threaded and is machined to define two zones of successively reduced diameter. Surrounding the upper of these reduced-diameter portions of extension screw 23 is a thrust-transmitting element made up of a bushing 26 and a bead 27, both formed of Teflon or other suitable material. The bushing 26 and bead 27 are mounted on extension screw 23 in nesting relation, and between them is carried a spring contact member 28, anchored at its outer end to an electrical terminal 29 which, in turn, is insulatedly supported by a header plate 30, rigidly secured within the housing 10. Contact member 28, in the embodiment shown, carries on its upper and lower surfaces a pair of electrical contacts respectively marked 31 and 32. Fixed electrical contacts 33 and 34 are mounted respectively above and below the contacts 31 and 32, the fixed contacts being carried on arms which are anchored to other terminals 35 and 36, insulatedly carried in the header plate 30 and, like terminal 29, extending through the header plate to permit external circuit connections thereto. (The portions of terminals 35 and 36 extending beyond header plate 30 are not shown on the drawing.) All the electrical-contact elements just described, including the spring arm 28, the contacts, the supports therefor, and the terminals, are made of non-magnetic material.

It will be understood by persons familiar with the relay art that the spring arm 28 carrying movable contacts 31 and 32, and the fixed contacts 33 and 34 which cooperate therewith, may, in most applications, be merely typical of other spring arms and fixed contacts disposed symmetrically around the extension screw 23. Thus, if the relay is to be of the 6-pole, double-throw type, six spring arms such as arm 28 would be mounted on appropriate terminals and disposed symmetrically around the extension screw 23. Since contact structures of this type are conventional in the art and do not form any part of the present invention, per se, I have in the drawing, in the interest of simplicity, shown only a typical contact assembly.

Diagrammatically indicated on the drawing are other terminals 41 and 42, indicating that additional sets of contacts may be provided, for actuation by my electromagnetic thrust motor.

The lowermost reduced-diameter zone of extension screw 23 is received within a sleeve-like spring seat 43, made of a suitable non-magnetic material such as stainless steel. Mounted directly below the spring seat 43, in a suitable central aperture provided therefor in header plate 30, is a lower spring seat 44, also made of non-magnetic material such as brass or stainless steel. Spring seat 44 is recessed on its upper face to receive a compression spring 45, the other end of which bears against the spring seat 43 already mentioned.

In the operation of the FIG. 1 form of my invention, the armature 20 normally occupies the position shown in FIG. 1, its upper surface being urged against the adjustment screw 12 by the force of spring 45. Under those conditions, the spring arm 28 holds electrical contact 31 pressed against fixed contact 33, the contact pressure thus produced being aided and increased by the force exerted by spring 45. It is important to note in this connection that the upward thrust exerted on the armature 20 is transmitted via pusher rod 21 and extension screw 23 by the abutment of spring seat 43 against the ledge 23a near the lower extremity of screw 23. As spring seat 43 bears against ledge 23a, it also bears against the bead 27, thus transmitting its thrust to the spring arm 28. There is, however, under these conditions, no positive mechanical connection between the pusher-rod assembly and the contact spring arm 28, since land 25 clears bushing 26 by an appreciable distance, preferably about .010 inch. Thus small movements of the armature 20 caused by vibration or shock are not transmitted to the spring contact arm 28.

When the magnet coil 17 is energized by electric current via suitable connecting leads (not shown), the resulting magnetic field in the core pieces 15 and 13 draws the armature 20 toward them, producing movement to the right as viewed in FIG. 1. The extension screw 23 may be factory-adjusted to a position such that this magnetic attraction cannot quite bring the armature into actual touching contact with the core pieces or, alternatively, the adjacent surfaces of the armature and core pieces may be plated with a non-magnetic material. It is desirable to maintain a clearance of a few thousandths of an inch between the armature and core pieces to minimize the creation of residual magnetism therein. Stop means for the armature travel toward the core pieces is provided by abutment of the contact 32 against the fixed contact 34, since, upon energization of the coil, the land 25 moves into abutment with the bushing 26, so that further advance of the pusher rod 21 is accompanied by corresponding movement of the spring arm 28.

As previously mentioned, stop means limiting the upward travel of armature 20 responsively to the force of spring 45 is provided by the adjustment screw 12 which, after being properly set, is permanently sealed in position.

The extraordinary superiority of my relay mechanism over prior-art relays of the same class is, I believe, due in large part to my design in which the magnet winding surrounds the major portion of the secondary core piece 13, the magnetic gap produced by ring 14 being situated well inside the limits of the coil 17. This construction is further aided, and the superior results are contributed to, by my armature design in which the armature is directly attracted by both the primary and secondary core pieces, the armature, when advanced by magnetic attraction, providing an effective magnetic path which parallels or bypasses the gap defined by ring 14.

Indicative of the superior results achievable by my relay, an embodiment wherein the magnet coil had a diameter of about 5/8 inch and a length of less than 3/8 inch produced 40 grams of thrust at a stroke of .030 inch with only .35 watt of electric power fed to the coil. The same relay provided a thrust of 60 grams at a stroke of .020 inch with the same electric power input. These thrust values are nearly double those achievable with best prior-art relays of the same physical size.

A larger embodiment of my relay, having a magnet coil about 1 1/8 inches in diameter and a length of about 3/8 inch, provided a thrust of 140 grams at a stroke of .030 inch with .5 watt of electric power fed to the coil. The same relay, adjusted to a stroke of .020 inch, provided a thrust of 150 grams with only .3 watt of electric power fed to the coil. These thrust values, again, are nearly double those achievable with the best prior-art structures of the same size.

In FIGS. 3 and 4, I have shown alternative modifications of my thrust motor. Since these alternative embodiments employ numerous components which are essentially like those used in the FIG. 1 form of the invention, the same reference numerals will be employed in FIGS. 3 and 4 as in FIG. 1, wherever the components are essentially the same.

In the FIG. 3 embodiment, I show an arrangement which may be used in applications wherein it is desirable to have the pusher rod extending away from the armature on the opposite side thereof from the core pieces. In FIG. 3, the thrust motor is carried within a cup-shaped housing 10 of magnetic material, structurally similar to the housing 10 in the FIG. 1 embodiment. Similarly, a primary core piece 15 is employed in FIG. 3, of the same conformation as the corresponding element in FIG. 1. In FIG. 3, however, the core piece 15 is placed within the housing 10 in the opposite position to the arrangement of FIG. 1, the base flange 15a being in FIG. 3 in direct abutment with the top plate 10a of the housing.

The top plate 10a is centrally apertured and threaded to receive a threaded member 75 which acts as an adjustable spring seat for a coil spring 76, presently to be described. As previously mentioned with respect to FIG. 1, it is usually desirable in instruments of the type under consideration to seal the housing tightly against ingress of moisture and other foreign matter. Therefore, the spring-seat element 75 will normally be soldered or brazed in position in top plate 10a after appropriate factory adjustment.

A secondary core piece 13, structurally similar to its FIG. 1 counterpart, is fitted tightly within the cylindrical portion of housing 10. As in the FIG. 1 form of the invention, the core piece 13 is generally annular in shape and has a base portion dimensioned to fit within housing 10, a body portion 13a of cylindrical conformation extending away from the base portion at right angles, and an inner annular flange portion 13b which extends inboard of the body portion 13a in a plane parallel to that of the base portion.

Disposed between the inner flange 13b of the secondary core piece 13 and the upper surface of primary core piece 15 is a magnetic isolator ring 14 similar in construction and function to its counterpart in FIG. 1.

A magnet coil 17, similar to its counterpart in the FIG. 1 embodiment, is wound over the primary core piece 15 on a suitably insulated form 19, the structure of the coil being similar to that in FIG. 1. Suitable apertures 16 may be provided in the base portion of secondary core piece 13 to provide passages for the wire terminals (not shown) of coil 17.

An armature 20 of shallow cup shape is positioned to overlie the inwardly extending flange 13b of the secondary core piece and the upper surface of primary core piece 15. A hollow rod 21 is fixedly secured centrally of the rear face of armature 20, and it extends into the hollow central interior of primary core piece 15, terminating, as shown, in a spring seat 21a which is formed to receive the free end of spring 76.

The interior of rod 21, and a corresponding central zone in the armature 20, are relieved to provide a passage for a thrust member 24 in the form of a solid threaded rod. The internal passage in rod 21 is suitably threaded to receive the rod 24, the relative axial positions of the two rods being thus adjustable by rotation of the rod 24. This adjustment also is normally made at the factory, and in the completed instrument the rod 24 will normally be held against rotation relative to the armature 20 and rod 21 by soldering, brazing, or any other suitable means.

In FIG. 3, the rod 24 is shown cut away, without any specific work device shown connected thereto. It will be understood, however, that the rod 24 may be used to actuate electric contacts, a valve, or any other device actuatable by a reciprocating movement. It will also be understood that suitable means will be provided in connection with rod 24 to limit its maximum outward travel.

The operation of the FIG. 3 embodiment of the invention is essentially like that of the FIG. 1 form, except that the disposition of the working thrust element is on the opposite side of the armature 20. The advantages previously discussed with reference to the FIG. 1 embodiment, such as superior thrust for a given size and power input, are equally achievable with the FIG. 3 form.

FIG. 4 shows a modified form of the FIG. 3 embodiment, in which the central portion of primary core piece 15 may be solid rather than hollow. Since the general structure and operation of the FIG. 4 embodiment are like those of the structure shown in FIG. 3, I shall not set forth at length the description of the FIG. 4 device, except to point out that in FIG. 4 the thrust rod 24 is directly secured to the front face of armature 20 by brazing, soldering, or welding, so that there is no part of the thrust-transmitting mechanism located behind the armature 20.

In the FIG. 4 form of the invention, the thrust rod 24 and the armature 20 are held against tilting or other non-axial movement by means of a guide sleeve or bushing 77, supported by a perforated disc 78 tightly fitted into housing 10 in a plane parallel to top plate 10a and at right angles to the axes of the core pieces.

In the FIG. 4 embodiment, maximum outward movement of the thrust rod 24 is limited by a transverse pin 79 which passes through the rod 24 at a suitable position inward of the bushing 77, while the armature 20 and rod 24 are normally urged away from the core pieces by a coil spring 81 which surrounds the rod 24 and is seated between the outer end of bushing 77 and a spring seat 82 held on rod 24 by a transverse pin 83.

It will be understood, of course, that the mechanical details by means of which movement of the armature and thrust rod are limited and controlled are matters of design which may be extensively modified within the scope of my invention.

While I have in this specification described in detail certain typical embodiments of my invention, it is to be understood that the description is illustrative rather than limiting. It is my intention that the scope of my invention be determined primarily by reference to the appended claims.

I claim:

1. An electromagnetic thrust motor comprising a housing of magnetic material having a top portion and a generally cylindrical side wall, an axially apertured primary core piece of magnetic material mounted in said housing, said primary core piece having a base flange abutting said side wall of said housing and having a central portion axially disposed in said housing and extending toward said top portion of said housing, a magnet coil surrounding said central portion of said primary core piece and extending beyond the forward end of said primary core piece to define an annular extension of substantially larger inner diameter than that of the main body of said coil, the inner boundary of said extension defining an axial recess, a secondary core piece of magnetic material formed to fit snugly against said housing and disposed partially within said recess, the part of said secondary core piece within said recess having an inwardly extending annular flange partly overlying the main body of said coil, the upper part of said primary core piece having an outwardly extending ledge disposed also within said recess and overlying at least part of the main body portion of said coil, said ledge and said last-mentioned flange being spaced slightly apart to define a magnetic gap between said core pieces, an armature of magnetic material having a shallow cup-shaped body and an outwardly extending annular rim at the upper edge of said body, said body being dimensioned to nest within said inward flange on said secondary core piece and said rim being dimensioned to fit within said recess and to overlie said flange, a pusher rod of nonmagnetic material axially mounted on said armature and disposed within the central aperture of said primary core piece, said pusher rod extending wholly therethrough and protruding therebelow, first nonmagnetic stop means for limiting movement of said armature away from said primary core piece, second nonmagnetic stop means for limiting movement of said armature toward said primary core piece, said second stop means preventing said armature from moving into touching relation with said core pieces, and resilient means normally holding said armature against said first stop means.

2. Apparatus according to claim 1 wherein the assembly comprising the pusher rod and the second stop means includes a device to be actuated by said pusher rod when said armature is magnetically attracted toward said core pieces, and a lost-motion coupling linking said pusher rod and said device to be actuated operative to actuate said device when said armature is magnetically attracted toward said core pieces but not operative to actuate said device responsively to small movements of said armature and pusher rod produced by shock or vibration.

3. Apparatus according to claim 1 wherein said annular coil extension is stepped to divide said recess into an inner recess and an outer recess, said secondary core piece being disposed within said outer recess with said inwardly extending flange disposed substantially flush with the bottom of said outer recess, said ledge portion of said primary core piece being disposed wholly within said inner recess.

4. The apparatus of claim 3 wherein the assembly comprising the pusher rod and the second stop means includes a device to be actuated by said pusher rod when said armature is magnetically attracted toward said primary core piece, and a lost-motion coupling linking said pusher rod and said device to be actuated operative to actuate said device when said armature is magnetically attracted toward said core pieces but not operative to actuate said device responsively to small movements of said armature and pusher rod produced by shock or vibration.

5. Apparatus according to claim 2 wherein said device to be actuated comprises a spring arm, electrical contacts respectively disposed on the upper and lower sides thereof, a first fixed contact disposed above said arm, the upper contact on said arm being normally in engagement therewith, a second fixed contact disposed below said spring arm, said second fixed contact being engaged by the lower contact on said spring arm when said armature is attracted magnetically toward said core pieces, said second fixed contact constituting at least a part of said second stop means, said resilient means being operative when said armature is not subjected to magnetic attraction to provide at least a portion of the contact pressure between said upper arm-carried contact and said first fixed contact.

6. In a shock-resistant electromagnetic switch including electrical contacts arranged to be opened and closed by at least one switch lever and a thrust element coupled to the said switch lever whenever the said switch is energized and effectively decoupled from the said switch lever whenever the said switch is de-energized, a miniaturized, high-power, electromagnetic thrust motor characterized by a magnetic circuit having principal and auxiliary air gaps, the said thrust motor comprising: first means having a first exposed surface and made of a material highly permeable to magnetic flux relative to air for establishing a first magnetic field in the space adjacent to the said first exposed surface; second means having a second exposed surface and made of a material highly permeable to magnetic flux relative to air disposed around the said first exposed surface for establishing a second magnetic field oriented in substantially the same direction as the said first magnetic field; third means having a substantially lower permeability to magnetic flux than the permeability of any one of the said first and second means for magnetically isolating the two last-mentioned means; fourth means for producing magnetic flux in the said first and second means such that the said first and second magnetic fields are caused to exist adjacent to the said first and second exposed surfaces; and an armature made of magnetic material displaceably mounted within the said adjacent spaces.

7. In an electromagnetic thrust motor wherein a thrust element is displaced by an armature, a magnetic circuit characterized by principal and auxiliary air gaps, the said magnetic circuit comprising: a primary core having a main body portion including a passageway for the said thrust element, and base and pole portions spaced apart on the said main body portion and disposed in an orientation substantially perpendicular to the said passageway; a secondary core characterized by a center opening having inner dimensions and a configuration of the outer rim of the said primary-core pole portion, and further characterized by a coil-receiving recess; means made of nonmagnetic material disposed between the said secondary core and the said primary-core pole portion for isolating the former from the latter; means for mounting the said secondary core in a position whereby the opening of the said coil-receiving recess faces the said primary-core base portion and whereby the said recess extends beyond the outermost end surface of the said primary core; a winding for conducting an electrical current disposed in the space between the said primary-core base and pole portions and in the said coil-receiving recess of the said secondary core; and an armature made of magnetic material having a surface disposed opposite to, and substantially coextensive with, the outermost end surface of the said primary-core pole portion and at least a portion of the outermost end surface of the said secondary core, such that a principal air gap may exist between the surface of the said armature and the outermost end surface of the said primary-core pole portion, and an auxiliary air gap may exist between the said armature and at least a portion of the outermost end surface of the said secondary core.

8. An electromagnetic thrust motor comprising a generally cylindrical housing of magnetic material, a primary core piece of magnetic material mounted in said housing, said primary core piece having a base flange abutting the inner wall of said housing and having a central portion axially disposed in said housing, a magnet coil surrounding said central portion of said primary core piece and extending axially therebeyond to define an annular extension of substantially larger inner diameter than that of the main body of said coil, the inner boundary of said extension defining an axial recess, a secondary core piece of magnetic material formed to fit snugly against the inner wall of said housing and disposed partially within said recess, the part of said secondary core piece within said recess having an inwardly extending annular flange partly overlying the main body of said coil, the upper part of said primary core piece having an outwardly extending ledge disposed also within said recess and overlying at least part of the main body portion of said coil, said ledge and said last-mentioned flange being spaced slightly apart to define a magnetic gap between said core pieces, an armature of magnetic material having a shallow cup-shaped body and an outwardly extending annular rim at its upper edge, said body being dimensioned to nest within said secondary core piece and said rim being dimensioned to fit within said recess and to overlie said flange, and a thrust rod axially mounted on said armature for transmitting thrust to an external object responsively to electromagnetic attraction between said armature and said core pieces, said motor comprising also means for centering said armature relative to said core pieces and restraining the same against non-axial movement relative thereto.

9. An electromagentic thrust motor comprising a primary core piece made of highly magnetic material and having a first exposed surface, a secondary core piece made of highly magnetic material and having a second exposed surface substantially parallel to said first surface, said secondary core piece being disposed coaxially and effectively displaced longitudinally with respect to said first core piece, spacing means made of nonmagnetic material engaging both of said core pieces and restraining them against relative movement while magnetically isolating them from one another, means comprising a magnet coil at least partially surrounding both of said core pieces for magnetizing the same responsively to a flow of electric current in said coil, and an armature made of magnetic material shaped to define a pair of substantially parallel surfaces respectively dimensioned and positioned to overlie and cooperate magnetically with said exposed surfaces of said core pieces, said motor comprising also means holding said armature coaxial with said core pieces while allowing it a limited range of axial movement.

10. An electromagnetic thrust motor comprising a primary core piece made of highly magnetic material and having a first exposed surface, a secondary core piece made of highly magnetic material and having a second exposed surface substantially parallel to said first surface, said secondary core piece being disposed coaxially and displaced longitudinally with respect to said first core piece, means restraining said primary and secondary core pieces against relative movement and operative to maintain a magnetic gap between them, means comprising a magnet coil at least partially surrounding both of said core pieces for magnetizing the same responsively to a flow of electric current in said coil, and an armature made of magnetic material shaped to define a pair of substantially parallel surfaces respectively dimensioned and positioned to overlie and cooperate magnetically with said exposed surfaces of said core pieces, said motor comprising also means holding said armature coaxial with said core pieces while allowing it a limited range of axial movement.

References Cited in the file of this patent
UNITED STATES PATENTS

| | | |
|---|---|---|
| 1,700,314 | Hartwig | Jan. 29, 1929 |
| 1,932,164 | Petit | Oct. 24, 1933 |
| 2,457,017 | Walley | Dec. 21, 1948 |
| 2,476,794 | Austin | July 19, 1949 |
| 2,507,940 | Southgate | May 16, 1950 |
| 2,775,671 | Dreyfus | Dec. 25, 1956 |
| 2,807,688 | Fischer et al. | Sept. 24, 1957 |